United States Patent Office 3,479,355

Patented Nov. 18, 1969

3,479,355

1,2,8,9-TETRAAZAPHENALENES

Karl J. Doebel, Ossining, and John E. Francis, Pleasantville, N.Y., assignors to Geigy Chemical Corporation, Ardsley, N.Y., a corporation of New York No Drawing. Continuation-in-part of application Ser. No. 715,528, Mar. 25, 1968. This application Oct. 15, 1968, Ser. No. 767,819

Int. Cl. C07d *51/10*

U.S. Cl. 260—250 8 Claims

ABSTRACT OF THE DISCLOSURE 1,2,8,9-tetraazaphenalenes optionally substituted in the 4, 5, 6, 7 and/or 9 positions and their salts, which are cardiovascular agents, are prepared by treatment of 2,6-disubstituted benzoic acid derivatives with hydrazine.

CROSS REFERENCE

This is a continuation-in-part of copending application Ser. No. 715,525, filed Mar. 25, 1968, now Patent No. 3,429,882, which in turn is a continuation-in-part of copending applications Ser. Nos. 583,980, 539,303 and 445,762, filed Oct. 3, 1966, Apr. 1, 1966, and Apr. 5, 1965, respectively all three now abandoned Ser. No. 539,303 being a continuation-in-part of Ser. No. 445,762 and Ser. No. 583,980 being a continuation-in-part of Ser. Nos. 539,303 and 445,762.

DETAILED DESCRIPTION

The present invention pertains to processes for the preparation of 1,2,8,9-tetraazaphenalenes of the formula

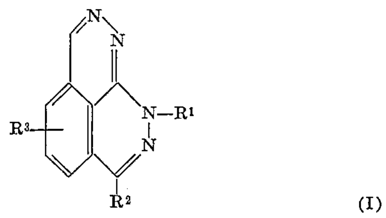

(I)

wherein $R^1$ is hydrogen, (lower)alkyl, phenyl or phenyl(lower) alkyl, $R^2$ is hydrogen or phenyl; and $R^3$ is hydrogen, chloro, bromo, (lower)alkoxy or carboxy;

and to the acid addition and quaternary salts thereof.

The term "alkyl" and derivations thereof such as "alkoxy" denotes a straight or branched hydrocarbon chain. When qualified by the designation (lower), such chain will contain up to and including 6 carbon atoms. Illustrative of such alkyl groups are methyl, ethyl, propyl, isopropyl, butyl, sec-butyl, t-butyl, pentyl, hexyl and the like while illustrative of such alkoxy groups are methoxy, ethoxy, propoxy, butoxy and the like.

The compounds of the present invention are identified herein as derivatives of the novel parent tricyclic nucleus 1,2,8,9-tetraazaphenalene which is assigned the following numbering

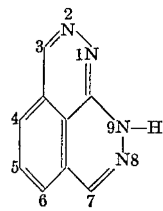

The 1,2,8,9-tetraazaphenalenes of the instant invention are cardiovascular agents, in particular, blood-pressure lowering agents. They also manifest coronary and peripheral vascular dilation properties, and effects on the central nervous system.

These compounds can be administered parenterally or orally in any of the usual pharmaceutical forms including tablets, capsules, powders, suspensions, solutions, syrups and the like, including sustained release preparations which can be compounded by any of the known procedures.

Preparation of the 1,2,8,9-tetraazaphenalenes can be accomplished in a number of ways. In a first embodiment, a 2,6-bis(dibromomethyl)benzoic acid or a 2,6-bis(dichloromethyl)benzoic acid of Formula II wherein X is bromo or chloro is treated with two or more molar equivalent amounts of hydrazine. This condensation is generally conducted at somewhat elevated temperatures optionally in the presence of a solvent, e.g., by refluxing an aqueous mixture of the reactants. This reaction may be represented as follows:

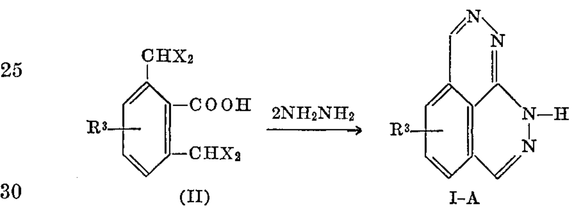

In a second embodiment, a 2-carbonyl-6-aldehydobenzoic acid of Formula III is treated with hydrazine under essentially the same conditions as described above:

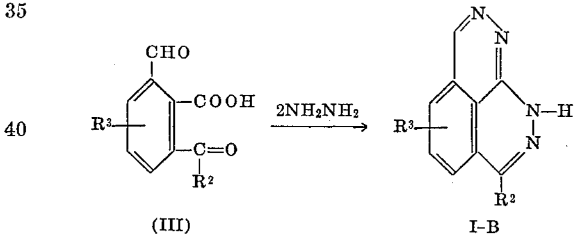

It is to be appreciated that the 2-carbonyl-6-aldehydobenzoic acid of Formula III is equivalent to its tautomeric 3-hydroxy-7-aldehydophthalide of Formula IV

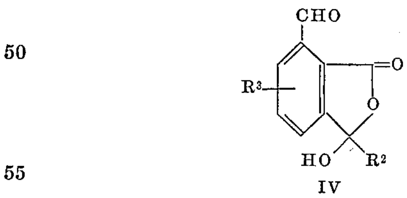

Thus the present process, incorporating all the above embodiments, involves treatment of a benzoic acid derivative of the formula

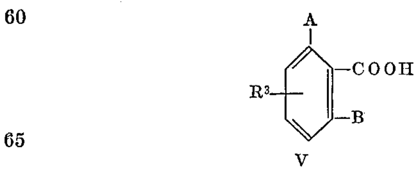

wherein (a) each of A and B is the dibromomethyl or dichloromethyl group or (b) (i) A is the aldehyde group and B is the aldehyde or benzoyl group or (ii) an internal tautomeric lactone thereof, with at least two molar equivalents of hydrazine until ring closure is complete and a compound of Formula I wherein $R^1$ is hydrogen as obtained.

Both the 2,6-bis(dihalomethyl)benzoic acids of Formula II and the 2-carbonyl-6-aldehydobenzoic acids of Formula III wherein $R^2$ is hydrogen can be readily prepared from 2,6-dimethylbenzoic acids through photochemical halogenation; e.g., reaction with four equivalents of bromine in carbon tetrachloride at reflux temperature and under the influence of light. Hydrolysis of the resultant 2,6-bis(dihalomethyl)benzoic acid of Formula II with dilute aqueous base, followed by acid hydrolysis yields the 2,6-dialdehydobenzoic acid of Formula III ($R^2$=H).

The starting materials of Formula III wherein $R^2$ is phenyl; i.e., 2-benzoyl-6-aldehydobenzoic acids, are prepared via an initial Grignard reaction with a 3-methylphthalic anhydride and isolation of the desired isomer, namely the 2-benzoyl-6-methylbenzoic acid. This is then brominated in a fashion analogous to that described above and the 2-benzoyl-6-dibromomethylbenzoic acid is then hydrolysed to yield the 2-benzoyl-6-aldehydobenzoic acid.

The following examples, presented for illustration and not limitation, will serve to further typify the nature of the present invention. In these examples temperature is expressed in degrees centigrade.

EXAMPLE 1

1,2,8,9-tetraazaphenalene

To a stirred solution of 100% hydrazine hydrate (20 ml.) in water (180 ml.) is aded in small portions 2,6-bis(dibromomethyl)benzoic acid (9.3 g.) The mixture is heated under reflux for 95 hours, treated with decolorizing carbon and filtered hot. On cooling, pale yellow needles crystallize from the filtrate. These are collected, washed with water and dried over phosphorus pentoxide to give 2.17 g. of 1,2,8,9-tetraazaphenalene, which sublimes at about 190–240° C. and decomposes at 294–298° C.

EXAMPLE 2

1,2,8,9-tetraazaphenalene (a) 2,6-bis(dibromomethyl)benzoic acid. A solution of 2,6-dimethylbenzoic acid (17 g.) in carbon tetrachloride (1200 ml.) is placed in a 3-necked flask with stirrer, dropping funnel and upright condenser leading to a dry wash bottle followed by a wash bottle containing water. The solution is heated to reflux and illuminated with a 250 watt tungsten lamp. Bromine (75 g.) in carbon tetrachloride (350 ml.) is added dropwise over 30 minutes, maintaining vigorous reflux. Stirring and heating are continued until the evolution of hydrogen bromide ceases. The mixture is cooled, filtered and the precipitate washed several times with carbon tetrachloride to yield the product, M.P. 203–206°.

*Analysis*.—Calcd.: C, 23.21; H, 1.30; Br, 68.64. Found: C, 23.49; H, 1.07; Br, 69.69.

(b) 3-hydroxy - 7 - aldehydophthalide.—2,6 - bis - (dibromomethyl)benzoic acid (37.2 g.) is added in small portions to a stirred solution of 5% sodium carbonate (600 ml.). The mixture is heated on a steam bath until a clear solution is obtained and then acidified under cooling with concentrated hydrochloric acid. The white precipitate which forms (9.12 g.) can be shown by analysis and infrared spectroscopy to be predominantly 3-hydroxy-7-aldehydophthalide. The aqueous mother liquor is extracted continuously wtih chloroform for 24 hours. Evaporation of the chloroform yields 2.57 g. of semi-solid containing the same material. When a portion of the first crop is recrystallized from benzene-hexane, a colorless solid is obtained, the melting point of which (127–133° C.) is not changed by further crystallizations.

*Analysis*.—Calcd.: C, 60.67; H, 3.40. Found: C, 60.62; H, 3.25.

(c) 1,2,8,9-tetraazaphenalene.—3-hydroxy-7-aldehydophthalide (11.7 g.) is suspended in water (390 ml.) and added slowly to a stirred solution of 100% hydrazine hydrate (47 ml.). A pale yellow solid which forms initially disappears when the solution is heated to reflux under stirring. After 66 hours at reflux the slightly turbid yellow solution is treated with decolorizing carbon, filtered hot and allowed to cool in a refrigerator. The product, 1,2,8,9-tetraazaphenalene, precipitates in hair-like yellow needles, M.P. 287–293° C., in a yield of 55%. Recrystallization from water, followed by absolute ethanol and again from water yields the analytically pure material, which sublimes at about 190–240° C. and decomposes at 294–298° C.

*Analysis*.—Calcd.: C, 63.51; H, 3.56; N, 32.94. Found: C, 63.69; H, 3.68; N, 32.78.

EXAMPLE 3

5-methoxy-1,2,8,9-tetraazaphenalene (a) 4-methoxy-2,6-bis(dibromomethyl)benzoic acid.—4-methoxy-2,6-dimethylbenzoic acid is dissolved in carbon tetrachloride (450 ml.) in a 3-necked flask equipped with mechanical sealed stirrer, reflux condenser and dropping funnel. The solution is heated to near reflux and illuminated with a 250 watt tungsten lamp as bromine (22.4 g., 7.5 ml.) in carbon tetrachloride (100 ml.) is added dropwise. Reflux is maintained for 2½ hours after completion of the addition, during which time a white precipitate forms. The mixture is cooled and filtered and the precipitate washed with a little carbon tetrachloride. The yield of pure white solid, M.P. 196–197°, is 15.68 g. or 90% of theory. A recrystallized (benzene) sample, M.P. 201–202°, afforded the following analysis:

Calcd. for $C_{10}H_8O_3Br_4$: C, 24.22; H, 1.62; Br, 64.48. Found: C, 24.27; H, 1.65; Br, 64.98.

(b) 3-hydroxy - 5 - methoxy-7-aldehydophthalide.—4-methoxy-2,6-bis(dibromomethyl)benzoic acid (99.2 g.) is added to 5% sodium carbonate solution (1500 ml.) and the mixture heated on the steam bath under magnetic stirring. The resulting yellow solution is filtered hot, allowed to cool and acidified with 6 N hydrochloric acid. A white precipitate which forms weighs 12.56 g. and melts at 164–166°. The mother liquor is extracted continuously with chloroform overnight. Evaporation of the chloroform yields an additional 2.5 g. of material. The total yield of material (15.06 g.) is 36% of theory. Recrystallization from benzene raises the melting point to 174–175°.

Calcd. for $C_{10}H_8O_5$: C, 57.69; H, 3.88. Found: C, 57.93; H, 3.59.

(c) 5-methoxy-1,2,8,9-tetraazaphenalene.—3-hydroxy-5-methoxy-7-aldehydophthalide (10.4 g.) is suspended in water (1200 ml.) and treated with 100% hydrazine hydrate (120 ml.). The resulting yellow solution is heated under reflux for 116 hours. The hot solution is filtered, and the filtrate allowed to cool. A yellow precipitate (5.4 g.) is collected, and is triturated twice with hot ethyl acetate. The residual solid (3.6 g.) is recrystallized from ethanol (800 ml.) containing ethyl acetate (50 ml.). The product is dried in vacuo at 80° for 16 hours. The yield of pale yellow crystals, M.P. 291–294° is 1.55 g. or 15.5% of theory.

Calcd.: C, 59.99; H, 4.02; N, 27.99. Found: C, 59.91; H, 4.23; N, 27.76.

EXAMPLE 4

5-bromo-1,2,8,9-tetraazaphenalene (a) 4-bromo-2,6-bis(dibromomethyl)benzoic acid.—4-bromo-2,6-dimethylbenzoic acid (2.29 g.) is suspended in carbon tetrachloride (120 ml.) and stirred at reflux under illumination from a 250 watt tungsten lamp. Bromine (6.4 g.) in carbon tetrachloride (30 ml.) is added dropwise over a 20 minute period. After a further 15 minutes, a white precipitate begins to appear. The mixture is stirred at reflux under illumination for three additional hours and then cooled and filtered. The product is washed with a little carbon tetrachloride and air dried. The yield of white solid, M.P. 219–221°, is 4.8 g., or 88% of theory. A sample recrystallized from benzene melts at 220–221°.

Calcd. for $C_9H_5Br_5O_2$: C, 19.84; H, 0.92; Br, 73.35. Found: C, 19.95; H, 0.71; Br, 73.43.

(b) 3 - hydroxy-5-bromo-7-aldehydophthalide.—To a 5% solution of sodium carbonate in water (160 ml.) is added under stirring 4-bromo-2,6-bis(dibromomethyl) benzoic acid (10.9 g.) and this solution is heated one-half hour on a steam bath. A transient white precipitate appears during the heating process. The solution is filtered hot and then cooled and acidified with 6 N hydrochloric acid. The solid is collected, washed with water and dried in vacuo. The white product (1.66 g.), M.P. 187–189°, may be used without further purification. Continuous chloroform extraction of the mother liquor over 24 hours yields an additional 0.54 g. of material.

(c) 5-bromo-1,2,8,9-tetraazaphenalene.—To a solution of 100% hydrazine hydrate (150 ml.) in water (1500 ml.) is added 3-hydroxy-5-bromo-7-aldehydophthalide (8.0 g.). The mixture is stirred at reflux for 144 hours, then cooled and filtered. The yellow precipitate (4.8 g.) is dissolved as well as possible in hot glacial acetate acid (250 ml.), filtered and the filtrate treated with 5% sodium carbonate until neutral. The product is collected, washed with water and dissolved as well as possible in 6 N hydrochloric acid (600 ml.). Filtration through sintered glass removes most of the impurity. The filtrate is evaporated to dryness, triturated with acetone and the precipitate collected. The solid (2.3 g.) is suspended in warm water (400 ml.) and the solution neutralized with 5% sodium carbonate. The precipitate is collected, washed with water and acetone, and dried. This material (1.85 g.) contains a trace of impurity and is again purified via hydrochloride formation as above. The resulting material (1.45 g.) is recrystallized from a mixture of dimethylformamide (500 ml.) and ethanol (1 liter). The pure product (1.03 g.) is thus obtained in golden yellow plates, M.P. >350°.

Calcd.: C, 43.41; H, 2.02; N, 22.49; Br, 32.08. Found: C, 43.52; H, 2.32; N, 22.56; Br, 31.95.

EXAMPLE 5

5-carboxy-1,2,8,9-tetraazaphenalene (a) Methyl 4-carboxy-2,6-bis(dibromomethyl)benzoate.—Methyl-4-carboxy-2,6-dimethylbenzoate (10.4 g.) is dissolved in hot carbon tetrachloride (700 ml.) and with stirring and irradiation with a 250 watt tungsten lamp, treated dropwise with bromine (11 ml.) in carbon tetrachloride (75 ml.). The mixture is stirred at reflux an additional 4 hours, cooled and filtered. The precipitate is twice recrystallized from benzene-hexane to yield the product as glistening white needles, M.P. 211.5–213°.

(b) 5 - carboxy - 1,2,8,9 - tetraazephenalene.—Methyl 4-carboxy-2,6-bis(dibromomethyl)benzoate (10.48 g.) is suspended in 5% aqueous sodium carbonate (150 ml.) and heated on the steam bath for 60 minutes. The mixture is filtered hot and filtrate cooled and acidified with hydrochloric acid. The acidic solution is evaporated in vacuo to half its original volume and extracted continuously with chloroform for 24 hours. Concentration of the chloroform extract yields a white solid intermediate which is used without further purification. This product (1.3 g.) is suspended in a solution of 100% hydrazine hydrate (15 ml.) and water (150 ml.) and heated at reflux for 173 hours. The yellow solution is filtered hot, cooled and acidified with glacial acetic acid. The product which precipitates (1.16 g.) is collected and dissolved in 5% sodium carbonatae (100 ml.) and filtered through sintered glass. The filtrate is acidified with glacial acetic acid and the solid which forms is collected, washed thoroughly with water and air dried. The product is obtained as a white solid, M.P. >340°. The NMR spectrum is in agreement with the assigned structure. In a deuterium oxide-sodium deuteroxide mixture, the spectrum shows two peaks of equal intensity, one at 6.90δ corresponding to protons at positions 4 and 6 and a second at 7.72δ corresponding to protons at positions 3 and 7.

Calcd.: for $C_{10}H_6N_4O_2 \cdot H_2O$: N, 23.15. Found: N, 22.93.

EXAMPLE 6

7-phenyl-1,2,8,9-tetraazephenalene (a) 3 - hydroxy - 3 - phenyl - 7 - dibromomethylphthalide.—3 - hydroxy - 3 - phenyl - 7 - methylphthalide (2-benzoyl-6-methylbenzoic acid, M.P. 124–6°) (2.4 g.) is suspended in carbon tetrachloride (200 ml.) in a 500 ml. 3-necked flask equipped with mechanical stirrer and two reflux condensers with drying tubes. A mixture of N-bromosuccinimide (3.5 g.) and benzoyl peroxide (0.1 g.) is added and the mixture stirred at reflux under illumination from a 250 watt tungsten lamp. After 3 hours, more benzoyl peroxide (0.05 g.) is added and the mixture stirred at deflux overnight. The mixture is filtered hot to remove most of the succinimide and the filtrate evaporated in vacuo. The brownish-white residue is recrystallized from benzene-hexane to yield 1.75 g. of buff-colored blocks. Recrystallization of this product from benzene-hexane raises the melting point to 166–170°, but the infrared spectrum is unchanged. Material once recrystallized is suitable for further reactions.

(b) 3 - hydroxy - 7 - benzoylphthalide.—3 - hydroxy-3-phenyl-7-dibromomethylphthalide (2.0 g.) is added to a stirred solution of 5% sodium carbonate (300 ml.) at about 80°. After one hour, the mixture is filtered hot and the clear filtrate cooled to 0–5° C. and acidified with concentrated hydrochloric acid. The mixture is refrigerated three hours and the white precipitate collected, washed with water and dried. The product is recrystallized twice from benzene-hexane, M.P. 109–111° C.

Calcd. for $C_{15}H_{10}O_4H_{20}$: C, 66.17; H, 4.45. Found: C, 66.27; H, 4.29.

I.R. (Nujol) 3500 cm.$^{-1}$ (hydroxy); 1755 cm.$^{-1}$ (γ-lactone); 1655 cm.$^{-1}$ (aryl ketone).

(c) 7-phenyl-1,2,8,9-tetraazephenalene.—To a solution of 100% hydrazine hydrate (10 ml.) in water (100 ml.) is added 3-hydroxy-7-benzoylphthalide (816 mg.) and the mixture stirred at reflux for 112 hours. At first a white precipitate forms but this gradually changes to a yellow precipitate. The mixture is filtered hot and the yellow precipitate is collected and dried. The crude product (630 mg.) M.P. 289–293°, is recrystallized from ethanol in bright yellow needles, M.P. 292–293°.

Calcd. for $C_{15}H_{10}N_4$: C, 73.15; H, 4.10; N, 22.76. Found: C, 73.30; H, 3.92; N, 22.88.

The material shows a single spot in T.L.C., fluorescent under U.V. light, $R_f = 0.63$ (5:1 benzene-DMF).

EXAMPLE 7

5-n-butoxy-1,2,8,9-tetraazephenalene (a) 4-n-butoxy-2,6-bis(dibromomethyl)benzoic acid.—4-n-butoxy-2,6-dimethylbenzoic acid, prepared according to Honkanen, Chem. Abstr. 55, 15400 (1961) (47.2 g.) is dissolved in carbon tetrachloride (2000 ml.) and stirred at reflux under illumination with a 250 watt tungsten lamp as bromine (45 ml.) in carbon tetrachloride (300 ml.) is added dropwise. The mixture is stirred at reflux for 4 hours thereafter. The reaction mixture is cooled, partially evaporated in vacuo, and allowed to stand under refrigeration overnight. The white precipitate which forms is collected, washed with carbon tetrachloride and dried over phosphorus pentoxide. The crude product (24.4 g.), M.P. 166–171°, is twice recrystallized from benzene and obtained in sparkling white needles, M.P. 187–188°.

Calcd.: for $C_{13}H_{14}Br_4O_3$: C, 29.02; H, 2.63; Br, 59.43. Found: C, 29.32; H, 2.40; Br, 59.59.

(b) 5-n-butoxy-1,2,8,9-tetraazephenalene.—A mixture of 4-n-butoxy-2,6-dibromomethylbenzoic acid (27.8 g.), hydrazine hydrate (130 ml.) and water (1300 ml.) is stirred at reflux for 120 hours, filtered and allowed to cool. The pale yellow solid which has formed is collected, washed with water and dried in vacuo. This crude product (1.54 g.) is purified by chromatography over Woelm neutral alumina, grade II (50 g.) with chloroform as solvent. Fractions of 200 ml. are collected and the eluted material checked by thin layer chromatography. Fraction No. 15 contains only pure 5-n-butoxy-1,2,8,9-tetraazaphenalene. The chloroform is evaporated in vacuo and the residue triturated with ethyl acetate. The pale yellow solid obtained on filtration, M.P. 229–237°, shows two prominent peaks at 1625 and 1560 cm.$^{-1}$ in the infrared spectrum typical for the tricyclic system and no peaks indicative of a bicyclic phthalazinone in the region 1630–1700 cm.$^{-1}$.

Alternatively this product can be obtained from 3-hydroxy-5-n-butoxy-7-aldehydophthalide in a fashion analogous to that described in Example 1.

What is claimed is:

1. Process for the preparation of a 1,2,8,9-tetraazaphenalene of the formula

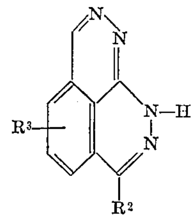

wherein $R^3$ is hydrogen, chloro, bromo, (lower)alkoxy or carboxy, and $R^2$ is hydrogen or phenyl, which comprises treating a benzoic acid derivative of the formula:

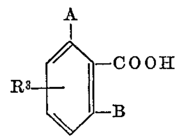

wherein (a) each of A and B is the dibromomethyl or dichloromethyl group, or (b) (i) A is the aldehyde group and B is the aldehyde or benzoyl group or (ii) an internal tautomeric lactone thereof, with at least two molar equivalents of hydrazine until ring closure is complete.

2. The process according to claim 1 wherein $R^2$ is hydrogen which comprises treating a benzoic acid derivative of the formula

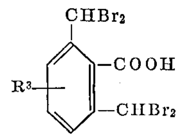

with at least two molar equivalent amounts of hydrazine until ring closure is complete.

3. The process according to claim 1 wherein an aqueous mixture of the reactants is heated at reflux.

4. The process according to claim 2 wherein $R^3$ is hydrogen, the benzoic acid derivative being 2,6-bis(dibromomethyl)benzoic acid.

5. The process according to claim 1 which comprises treating a benzoic acid derivative of the formula

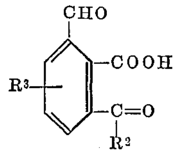

or the corresponding tautomeric 3-hydroxy-7-aldehydophthalide with at least two molar equivalent amounts of hydrazine until ring closure is complete.

6. The proces according to claim 5 wherein an aqueous mixture of the reactants is heated at reflux.

7. The process according to claim 5 wherein $R^2$ and $R^3$ are each hydrogen, the benzoic acid derivative being 2,6-dialdehydobenzoic acid or the tautomeric 3-hydroxy-7-aldehydophthalide.

8. The process according to claim 5 wherein $R^2$ is phenyl and $R^3$ is hydrogen, the benzoic acid derivative being 2-aldehydo-6-benzoylbenzoic acid or the tautomeric 3-hydroxy-7-benzoylphthalide.

No references cited.

NICHOLAS S. RIZZO, Primary Examiner